US007984190B2

(12) United States Patent
Rhoads

(10) Patent No.: US 7,984,190 B2
(45) Date of Patent: Jul. 19, 2011

(54) SYSTEM AND METHOD FOR MANAGING CONTENT ON MOBILE PLATFORMS

(75) Inventor: Cedric Rhoads, Bothell, WA (US)

(73) Assignee: Panasonic Avionics Corporation, Bothell, WA (US)

( * ) Notice: Subject to any disclaimer, the term of this patent is extended or adjusted under 35 U.S.C. 154(b) by 1049 days.

(21) Appl. No.: 11/123,327

(22) Filed: May 6, 2005

(65) Prior Publication Data

US 2005/0256616 A1 Nov. 17, 2005

Related U.S. Application Data

(60) Provisional application No. 60/569,101, filed on May 7, 2004.

(51) Int. Cl.
*G06F 15/16* (2006.01)
(52) U.S. Cl. .......................... 709/248; 725/76
(58) Field of Classification Search .................. 725/105, 725/76, 109; 714/4; 455/13.4; 709/248
See application file for complete search history.

(56) References Cited

U.S. PATENT DOCUMENTS

| 5,243,652 | A | * | 9/1993 | Teare et al. .................. 380/250 |
| 5,524,272 | A | | 6/1996 | Podowski et al. |
| 5,950,129 | A | | 9/1999 | Schmid et al. |
| 5,959,596 | A | | 9/1999 | McCarten et al. |
| 6,047,165 | A | | 4/2000 | Wright et al. |
| 6,108,523 | A | | 8/2000 | Wright et al. |
| 6,160,998 | A | | 12/2000 | Wright et al. |
| 6,163,681 | A | | 12/2000 | Wright et al. |
| 6,167,238 | A | | 12/2000 | Wright |
| 6,173,159 | B1 | | 1/2001 | Wright et al. |
| 6,181,990 | B1 | | 1/2001 | Grabowsky et al. |
| 6,249,913 | B1 | | 6/2001 | Galipeau et al. |
| 6,285,878 | B1 | | 9/2001 | Lai |
| 6,308,045 | B1 | | 10/2001 | Wright et al. |
| 6,522,867 | B1 | | 2/2003 | Wright et al. |
| 6,542,086 | B2 | | 4/2003 | Baumgartner et al. |
| 6,745,010 | B2 | | 6/2004 | Wright et al. |
| 6,757,712 | B1 | | 6/2004 | Bastian et al. |

(Continued)

FOREIGN PATENT DOCUMENTS

EP 0890907 1/1999

(Continued)

OTHER PUBLICATIONS

US, Office Action, U.S. Appl. No. 09/952,629, Mar. 14, 2006.

(Continued)

*Primary Examiner* — Ajay Bhatia
(74) *Attorney, Agent, or Firm* — Orrick, Herrington & Sutcliffe LLP

(57) ABSTRACT

A content management system for providing comprehensive content management for one or more vehicle information systems and methods for manufacturing and using same. The content management system includes a content control system for providing content storage and controlling the overall functionality of the content management system. Being configured to communicate with a selected vehicle information system in a wired and/or wireless manner, the content management system can upload content to update the vehicle information system for access during subsequent travel. The content management system likewise can download content, such as performance data compiled during prior travel, from the vehicle information system. The content management system thereby can provide ensured comprehensive content management under the control of the content control system.

35 Claims, 8 Drawing Sheets

U.S. PATENT DOCUMENTS

| | | | |
|---|---|---|---|
| 6,775,545 | B2 | 8/2004 | Wright et al. |
| 6,796,495 | B2 | 9/2004 | Stahl et al. |
| 6,810,527 | B1 * | 10/2004 | Conrad et al. .................. 725/76 |
| 6,813,777 | B1 * | 11/2004 | Weinberger et al. ........... 725/76 |
| 6,876,905 | B2 | 4/2005 | Farley et al. |
| 6,899,390 | B2 | 5/2005 | Sanfrod et al. |
| 6,938,258 | B1 * | 8/2005 | Weinberger et al. ......... 719/312 |
| 6,990,338 | B2 | 1/2006 | Miller et al. |
| 7,036,889 | B2 | 5/2006 | Sanfrod et al. |
| 7,100,187 | B2 | 8/2006 | Pierzga et al. |
| 7,124,426 | B1 | 10/2006 | Tsuria et al. |
| 7,136,621 | B2 * | 11/2006 | de La Chapelle et al. ... 455/13.2 |
| 7,177,638 | B2 | 2/2007 | Funderburk et al. |
| 7,280,825 | B2 | 10/2007 | Keen et al. |
| 7,483,696 | B1 | 1/2009 | Mitchell |
| 7,496,361 | B1 | 2/2009 | Mitchell et al. |
| 7,904,244 | B2 * | 3/2011 | Sugla .............................. 725/76 |
| 2001/0025377 | A1 * | 9/2001 | Hinderks ...................... 725/109 |
| 2002/0058478 | A1 * | 5/2002 | de La Chapelle et al. ... 455/13.4 |
| 2002/0059614 | A1 | 5/2002 | Lipsanen et al. |
| 2002/0069293 | A1 * | 6/2002 | Natalio ......................... 709/238 |
| 2002/0087992 | A1 | 7/2002 | Bengeult et al. |
| 2003/0043760 | A1 | 3/2003 | Taylor |
| 2003/0060190 | A1 | 3/2003 | Mallart |
| 2003/0067542 | A1 * | 4/2003 | Monroe ......................... 348/148 |
| 2003/0069015 | A1 | 4/2003 | Brinkley et al. |
| 2003/0085818 | A1 | 5/2003 | Renton et al. |
| 2003/0107248 | A1 | 6/2003 | Sanford et al. |
| 2003/0140345 | A1 * | 7/2003 | Fisk et al. ....................... 725/78 |
| 2003/0148736 | A1 | 8/2003 | Wright et al. |
| 2003/0158958 | A1 * | 8/2003 | Chiu ............................. 709/231 |
| 2003/0160710 | A1 | 8/2003 | Baumgartner et al. |
| 2003/0161411 | A1 * | 8/2003 | McCorkle et al. ............ 375/295 |
| 2003/0184449 | A1 | 10/2003 | Baumgartner et al. |
| 2003/0233469 | A1 * | 12/2003 | Knowlson et al. ............ 709/238 |
| 2003/0237016 | A1 * | 12/2003 | Johnson et al. ................... 714/4 |
| 2004/0054923 | A1 * | 3/2004 | Seago et al. ................... 713/201 |
| 2004/0077308 | A1 | 4/2004 | Sanford et al. |
| 2004/0088412 | A1 * | 5/2004 | John et al. ..................... 709/226 |
| 2004/0098745 | A1 | 5/2004 | Marston et al. |
| 2004/0111523 | A1 * | 6/2004 | Hall et al. ...................... 709/230 |
| 2004/0133634 | A1 * | 7/2004 | Luke et al. .................... 709/203 |
| 2004/0139467 | A1 * | 7/2004 | Rogerson et al. ............... 725/76 |
| 2004/0167967 | A1 * | 8/2004 | Bastian et al. ................. 709/206 |
| 2004/0183346 | A1 | 9/2004 | Sanford et al. |
| 2005/0027787 | A1 * | 2/2005 | Kuhn et al. .................... 709/200 |
| 2005/0039208 | A1 * | 2/2005 | Veeck et al. ..................... 725/76 |
| 2005/0102322 | A1 * | 5/2005 | Bagley et al. ............... 707/104.1 |
| 2005/0136917 | A1 * | 6/2005 | Taylor ......................... 455/432.1 |
| 2005/0138654 | A1 * | 6/2005 | Minne .............................. 725/31 |
| 2005/0202785 | A1 | 9/2005 | Meyer |
| 2005/0216938 | A1 | 9/2005 | Brady et al. |
| 2005/0268319 | A1 * | 12/2005 | Brady, Jr. ........................ 725/76 |
| 2006/0032979 | A1 | 2/2006 | Mitchell et al. |
| 2006/0088001 | A1 | 4/2006 | Reitmann et al. |
| 2006/0174285 | A1 | 8/2006 | Brady, Jr. et al. |
| 2006/0187959 | A1 * | 8/2006 | Kawaguchi et al. .......... 370/468 |
| 2006/0217121 | A1 | 9/2006 | Soliman et al. |
| 2006/0234700 | A1 | 10/2006 | Funderburk et al. |
| 2007/0022018 | A1 * | 1/2007 | Suryanarayana et al. ...... 705/26 |
| 2007/0130599 | A1 * | 6/2007 | Monroe ......................... 725/105 |
| 2007/0185977 | A1 * | 8/2007 | Sato et al. ..................... 709/219 |
| 2008/0141314 | A1 * | 6/2008 | Lemond et al. .................. 725/76 |
| 2009/0077595 | A1 * | 3/2009 | Sizelove et al. .................. 725/76 |
| 2009/0083805 | A1 * | 3/2009 | Sizelove et al. .................. 725/76 |

FOREIGN PATENT DOCUMENTS

| | | |
|---|---|---|
| WO | WO02/084971 | 10/2002 |
| WO | WO 03/032503 A2 | 4/2003 |
| WO | WO 03/050000 A1 | 6/2003 |
| WO | WO 2004/003696 A2 | 1/2004 |
| WO | WO 2004/008277 A2 | 1/2004 |
| WO | WO 2006/062641 A2 | 6/2006 |
| WO | WO 2006/065381 A2 | 6/2006 |

OTHER PUBLICATIONS

US, Office Action, U.S. Appl. No. 09/952,629, Dec. 1, 2006.
US, Office Action, U.S. Appl. No. 09/952,629, Jun. 27, 2007.
US, Office Action, U.S. Appl. No. 09/952,629, Oct. 27, 2008.
US, Office Action, U.S. Appl. No. 09/952,629, Mar. 18, 2008.
US, Office Action, U.S. Appl. No. 09/952,629, Jun. 2, 2009.
US, Office Action, U.S. Appl. No. 09/811,317, Feb. 28, 2002.
US, Office Action, U.S. Appl. No. 09/811,317, Aug. 13, 2002.
US, Office Action, U.S. Appl. No. 09/811,317, Dec. 30, 2002.
US, Notice of Allowance and Fees due, U.S. Appl. No. 09/811,317, Jul. 14, 2003.
US, Office Action, U.S. Appl. No. 08/863,448, Sep. 24, 1997.
US, Office Action, U.S. Appl. No. 08/863,448, Apr. 27, 1998.
US, Notice of Allowance, U.S. Appl. No. 08/863,448, Feb. 17, 1999.
US, Office Action, U.S. Appl. No. 08/479,654, Jan. 24, 1997.
US, Office Action, U.S. Appl. No. 08/479,654, Aug. 21, 1995.
US, Office Action, U.S. Appl. No. 08/479,654, Mar. 1, 1996.
US, Office Action, U.S. Appl. No. 08/479,654, Aug. 5, 1997.
US, Office Action, U.S. Appl. No. 08/071,218, Dec. 7, 1994.
US, Office Action, U.S. Appl. No. 08/071,218, Apr. 20, 1995.
US, Notice of Allowance and Fees due, U.S. Appl. No. 08/071,218, Aug. 7, 1995.
US, Office Action, U.S. Appl. No. 08/480,666, Feb. 9, 1996.
US, Notice of Allowance and Fees due, U.S. Appl. No. 08/480,666, Sep. 5, 1996.
US, Office Action, U.S. Appl. No. 08/480,666, Oct. 16, 1996.
US, Office Action, U.S. Appl. No. 08/480,666, Nov. 22, 1996.
JP, Office Action, 2004-199893, Jul. 5, 2005.
JP, Office Action, 2006-000840, Feb. 28, 2007.
US, Office Action, U.S. Appl. No. 08/363,228, Oct. 3, 1995.
US, Office Action, U.S. Appl. No. 08/363,228, Mar. 27, 1996.
US, Notice of Allowance and Fees due, U.S. Appl. No. 08/363,228, Apr. 9, 1996.
US, Office Action, U.S. Appl. No. 10/772,565, Mar. 4, 2009.
PCT, International Search Report, PCT/US2004/017666, Apr. 2, 2005.
EP, Communication, App. No. 04754296.4-1241, Apr. 4, 2007.
AU, First Report, App No. 2004251677, Sep. 26, 2008.
Y.F. Chen, et al., "Personalized Multimedia Services Using a Mobile Service Platform", IEEE 2002, pp. 918-215.
S. Gratschew, et al., "A Multimedia Messaging Platform for Content Delivering", IEEE 2003, pp. 431-435.
A. Ibenthal, et al.,"Multimedia im Fahrzeug: Dienste und Technik", Fernseh und Kino-Technik 54, Jahrgang Nr. Mar. 2000, pp. 100-105.

* cited by examiner

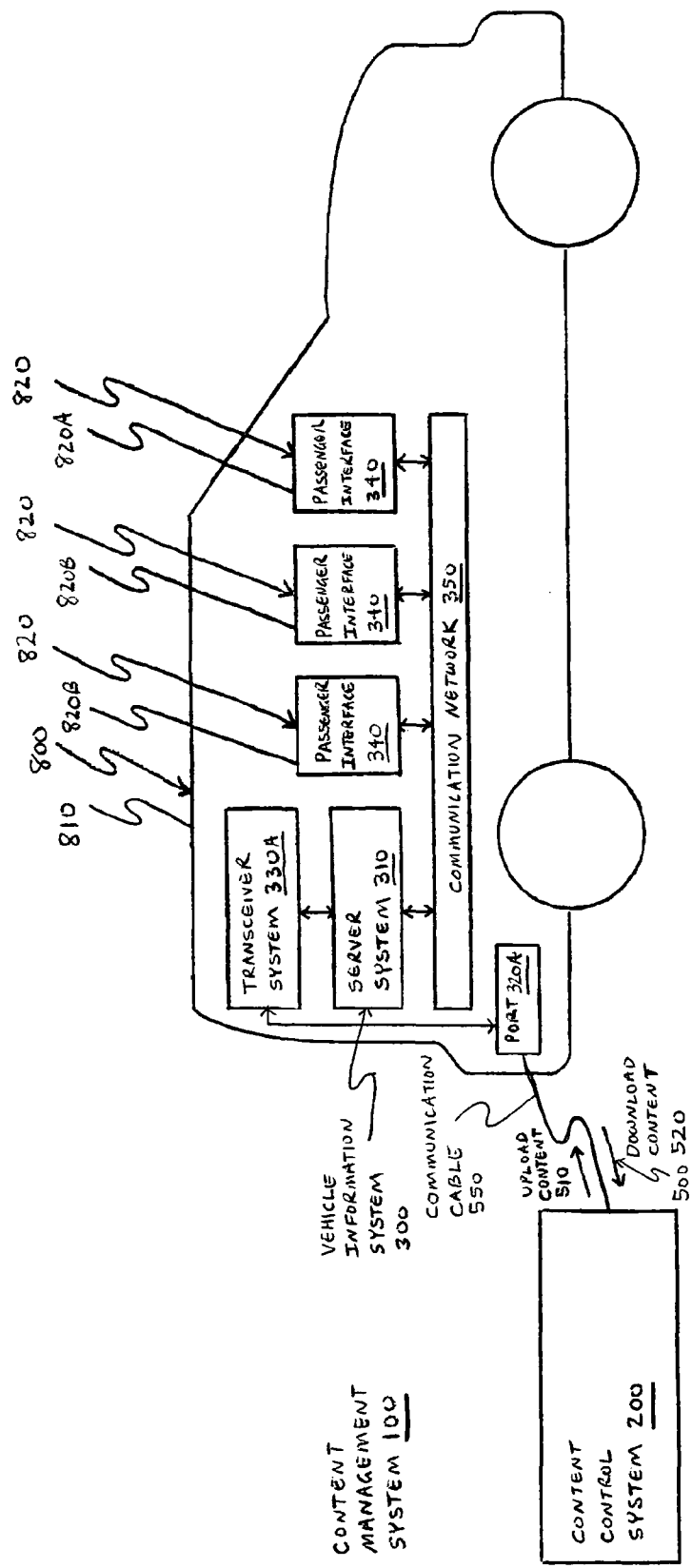

SYSTEM AND METHOD FOR MANAGING CONTENT ON MOBILE PLATFORMS

CROSS-REFERENCE TO RELATED APPLICATION

This application claims priority to U.S. Provisional Application Ser. No. 60/569,101, filed on May 7, 2004. Priority to the prior application is expressly claimed, and the disclosure of the application is hereby incorporated by reference in its entirety.

FIELD

The present disclosure relates generally to data management systems and more particularly, but not exclusively, to systems for managing data associated with passenger entertainment systems installed on a mobile platform.

BACKGROUND

The advent of digital media has made it possible to store large quantities of data in a very small physical footprint and has been advantageously applied in passenger entertainment systems for storing entertainment content aboard a passenger vehicle.

Despite a resultant increase in content quality and, therefore, passenger satisfaction, however, management of digital media has become one of the biggest headaches for owners of such passenger entertainment systems. Not only has the logistics of provisioning digital media proven to be more cumbersome than traditional analog media provisioning, but the use of digital media also can result in increased operating expenses, necessitating additional capital investment. Although satellite technology and wireless network technology each can provide limited provisioning digital media capabilities, both technologies have proven to be too slow and too expensive to be practical for provisioning digital media libraries.

Thus, as usage of passenger entertainment systems continues to increase, it would be desirable to provide an affordable, effective solution for provisioning content that overcomes the obstacles of currently-available media provisioning systems.

BRIEF DESCRIPTION OF THE DRAWINGS

FIG. 2A is an exemplary block diagram illustrating an embodiment of the vehicle information system of FIG. 1 in which the vehicle information system is installed in an automobile.

Figure 1:
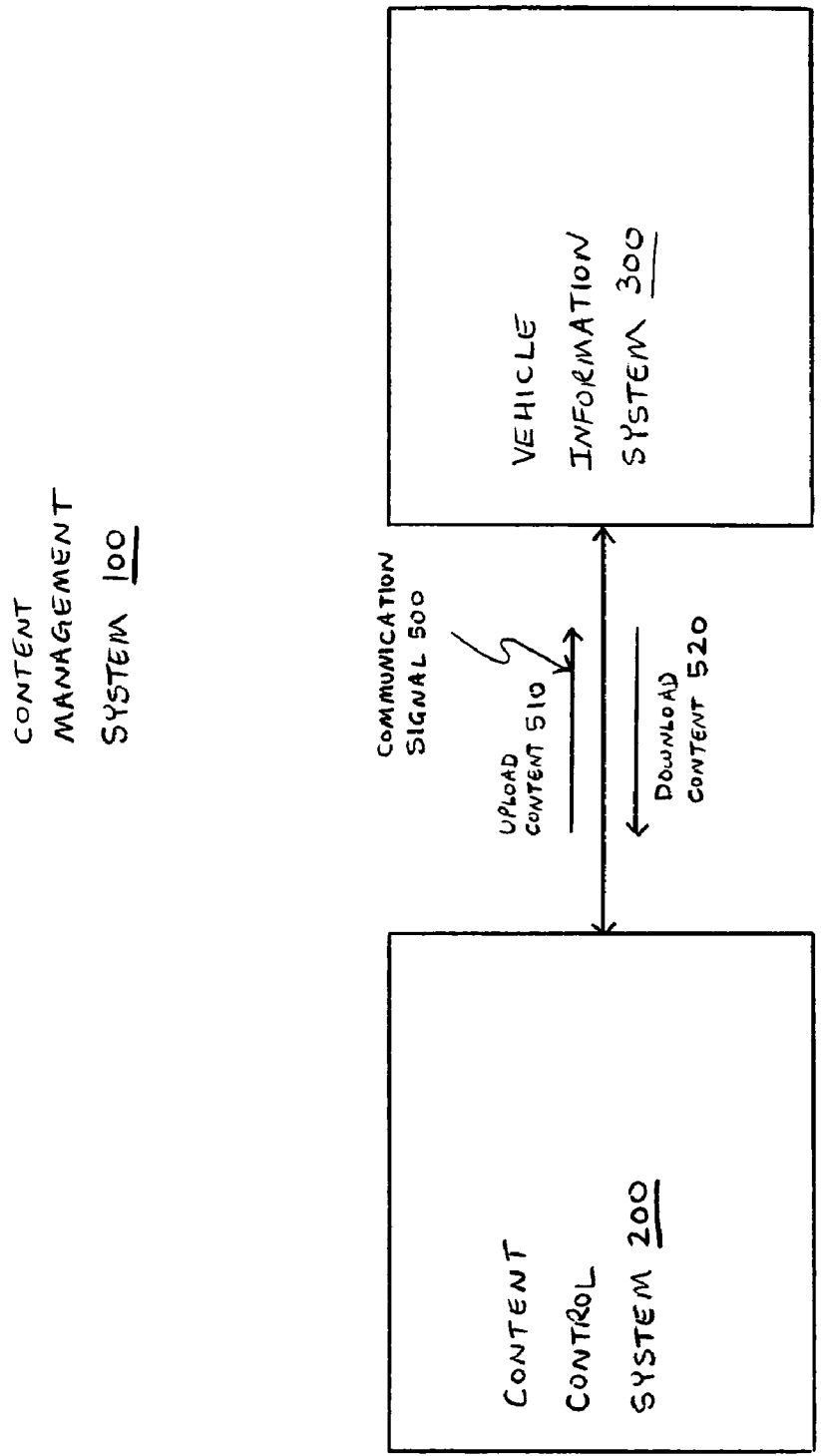
FIG. 1 is an exemplary top-level block diagram illustrating an embodiment of a content management system in which the content management system includes a content control system for providing comprehensive content management for a vehicle information system.

It should be noted that the figures are not drawn to scale and that elements of similar structures or functions are generally represented by like reference numerals for illustrative purposes throughout the figures. It also should be noted that the figures are only intended to facilitate the description of the preferred embodiments of the present disclosure. The figures do not illustrate every aspect of the present disclosure and do not limit the scope of the disclosure.

DETAILED DESCRIPTION OF THE DRAWINGS

Since currently-available media provisioning systems are too slow and too expensive to be practical, a content management system that can facilitate automated, hands-off content distribution can prove to be much more desirable and provide a basis for a wide range of information systems, such as passenger entertainment systems. This result can be achieved by employing a content management system 100 as shown in FIG. 1.

The content management system 100 is illustrated in FIG. 1 as including a content control system 200 for providing content storage and for controlling the distribution of the stored content among one or more vehicle information systems 300. The content control system 200 can be provided in any conventional manner, including via one or more hardware components and/or software components. Through a wired and/or wireless exchange of communication signals 500, the content control system 200 can communicate with a selected vehicle information system 300, providing (or uploading) predetermined upload content 510 to the vehicle information system 300 and/or receiving (or downloading) predetermined download content 520 from the vehicle information system 300. The content management system 100 thereby can be configured to provide ensured comprehensive content management under the control of the content control system 200. Stated somewhat differently, the content control system 200 can provide one or more content management services for the vehicle information system 300.

Advantageously, the content management system 100 can be configured to eliminate the necessity for vehicle-side human resources to perform content, including media and/or data, provisioning tasks. Within the content management system 100, for example, content, in whole or in part, can be loaded into the content control system 200 and distributed to the vehicle information system 300. When factored across a fleet of vehicles 800 (shown in FIGS. 2A-B), this will represent a substantial labor savings for the vehicle operators while adding flexibility. Costs associated with portable media loaders (PMLs) likewise can be reduced.

The content control system 200 preferably includes an interactive software API (such as on an iBrowser platform) to pull meta-data from the content itself. The content control system 200 thereby can be configured to perform dynamic media content management. Stated somewhat differently, the content control system 200 can automatically recognize new content installed in the content control system 200 and dynamically reconfigure the relevant passenger interface systems 340 (shown in FIGS. 2A-B), such as a passenger interactive graphical user interface (GUI), of vehicle information system 300 to display the new content for passenger consumption. Interactive software updates thereby do not need to be performed each time that the content is updated.

As such, in contrast to the current method in which content is updated periodically (usually monthly), the content management system 100 permits content to be updated substantially dynamically and/or continuously such that new content can be deployed substantially upon receipt. The content management system 100 can include one or more content libraries (not shown) for providing selected content. For example, by performing a passenger usage statistical analysis, content for the content libraries can be selected based at least in part upon passenger usage. By tailoring the content library to the most popular titles, revenue generation can be increased such as when pay-per-view is offered.

The content management system 100 likewise can be configured to include other functionality. For example, the content management system 100 can have recording capability for recording content associated with television programming, such as direct broadcast satellite (DBS) television programming. Television content thereby can be recorded and deployed in the manner used with regard to personal video recording (PVR) systems. Similarly, satellite capability can be advantageously employed for automating content deployment, such as core content. The content management system 100 likewise can provide rights management functionality, such as digital rights management (DRM) functionality, for incorporating and/or controlling any rights, including copyright, trademark, and/or patent rights, associated with the content that is distributed via the content control system 200. For example, the rights management functionality of the content management system 100 can include management of content licenses, revocation of content associated with expired licenses, and/or control payment of any fees, such as pay-per-view settlements, to the content owners.

If deployed in conjunction with a web-based content build/management tool, the content management system 100 can be configured to "build" content loads in accordance with a variety of user-defined criteria, such as fleet, system type, route, and/or tail-sign, via a computer system 270 (shown in FIG. 3), such as a personal computer system. As desired, the computer system 270 can be provided as a part of the content control system 200. The content to be retained, removed, and/or added to the content library thereby can be identified and selected. The computer system 270 likewise can be utilized to provide a schedule for executing updates and other changes to the content.

The content management system 100 further can support all manner of additional content 510, 520 transport to and/or from the vehicle 800 with minimal (or no) incremental cost increase. If the vehicle information system 300 comprises an aircraft passenger in-flight entertainment system (IFE) installed aboard an aircraft 820 (shown in FIG. 2B), for example, representative content can include IFE System Software, Built-In Test Equipment (BITE) and configuration reports, passenger usage statistics, credit card transactions, and/or cached web content. Other types of content likewise can be communicated via the content management system 100. Exemplary non-IFE content can include electronic flight bag content, engine performance reports, aircraft BITE reports, surveillance video, crew reporting, stores requests, an integrated cabin maintenance log, cabin or duty-free sales inventory management, passenger survey data, and/or passenger comment reports.

Figure 2B:
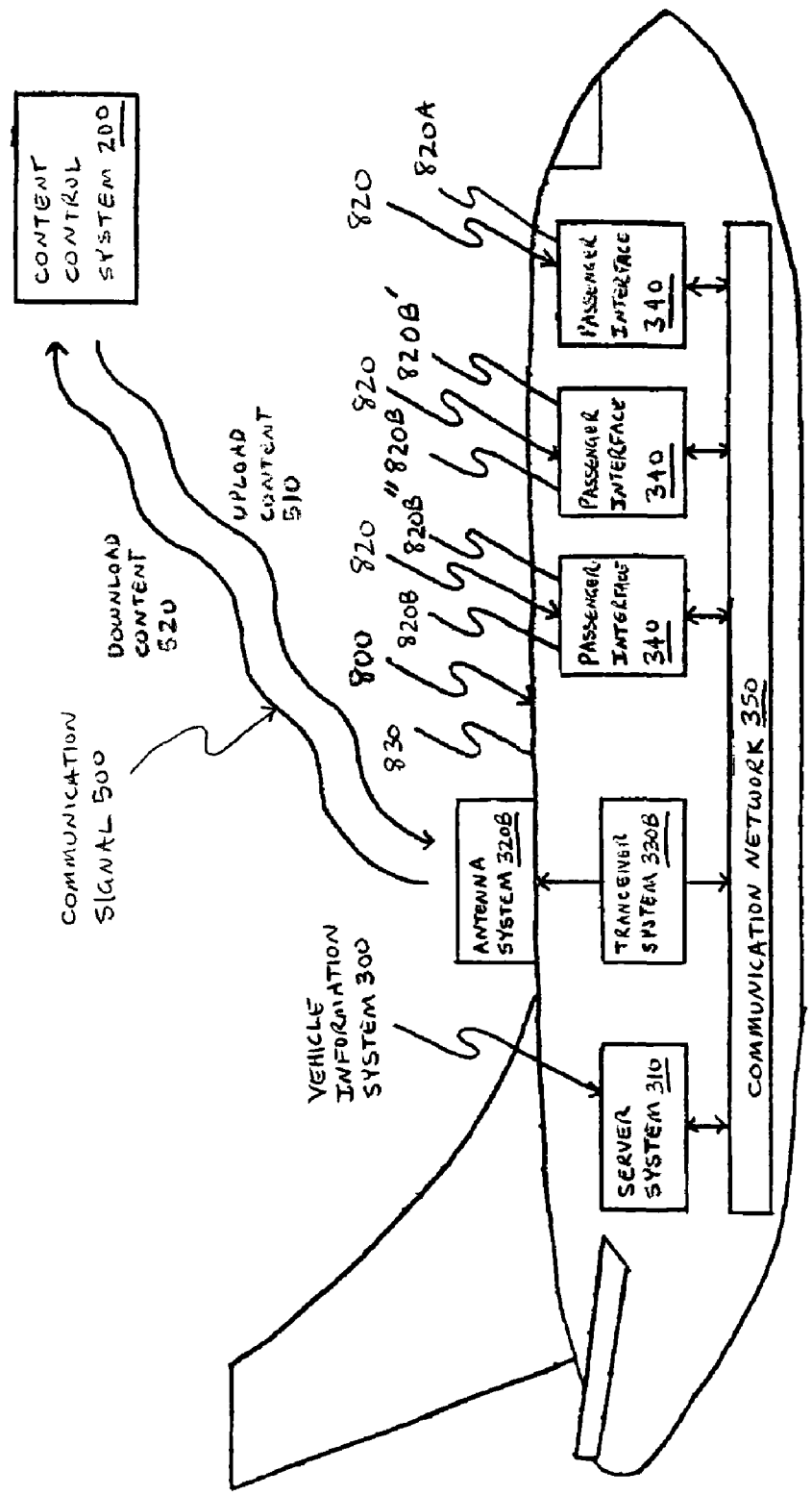
FIG. 2B is an exemplary block diagram illustrating an alternative embodiment of the vehicle information system of FIG. 1 in which the vehicle information system is installed in an aircraft.

Turning to FIGS. 2A-B, the vehicle information system 300 can comprise a conventional information system and can be configured to be installed in any suitable type of vehicle 800. Exemplary types of vehicle 800 suitable for installation of vehicle information systems 300 can include automobiles 810 (shown in FIG. 2A), aircraft 820 (shown in FIG. 2B), buses, recreational vehicles, and/or boats, without limitation. If installed on an aircraft 830 as illustrated in FIG. 2B, for example, the vehicle information system 300 can comprise a conventional aircraft passenger in-flight entertainment system, such as the Series 2000, 3000, eFX, and/or eX2 in-flight entertainment systems as manufactured by Panasonic Avionics Corporation (formerly known as Matsushita Avionics Systems Corporation) of Lake Forest, Calif. Although shown and described with reference to FIGS. 2A-B as comprising passenger entertainment systems for purposes of illustration, the vehicle information system 300 can comprise any type of conventional information system suitable for installation in vehicles 800.

Turning to FIG. 2A, the vehicle information system 300 can include a server system 310 for receiving the upload content 510 from the content control system 200 and/or providing the download content 520 to the content control system 200, as desired. The upload content 510 can be stored via the server system 310 for access during subsequent travel. In the manner set forth in more detail in the co-pending U.S. patent application, entitled "SYSTEM AND METHOD FOR DOWNLOADING FILES," Ser. No. 10/772,565, filed on Feb. 4, 2004, which is assigned to the assignee of the present application and the disclosure of which is hereby incorporated herein by reference in its entirety, the upload content 510 can comprise any suitable type of content and can be provided in any appropriate analog format and/or digital format. Preferably being provided in any conventional compressed format to facilitate the exchange of the communication signals 500 between the content control system 200 and the vehicle information system 300, the upload content 510 may be provided in an uncompressed format, as desired.

The upload content 510, for example, can have preselected entertainment content, including audio content, such as music or audio books, and/or video content, such as motion pictures, television programming, or any other type of audiovisual work. As desired, the upload content 510 can comprise stored (or time-delayed) viewing content and/or live (or real-time) viewing content, such as broadcast transmissions of live events or pre-recorded events. Illustrative formats for the upload content 510 can include Audio Video Interleave (AVI) format, Joint Photographic Experts Group (JPEG) format, and Moving Picture Experts Group (MPEG) format; whereas, Waveform (WAV) format and MPEG Audio Layer 3 (MP3) format comprise exemplary formats for the audio content. Depending, for instance, on the system capacity and/or the nature of the stored content, the upload content 510 can supplement, update, and/or replace the viewing content previously stored on the server system 310.

Geographical data likewise can be included with the upload content 510. The geographical data can comprise information associated with the destination of the vehicle 800 and/or other points of interest that may, or may not, be related to one or more preselected travel routes for the vehicle 800. For example, the upload content 510 can include information relating to hotel accommodations and/or a map of the destination city. If the destination of the vehicle 800 is an airport terminal, information, such as arrival and departure times and gate information, for other flights may be provided to assist the passenger with making his connecting flight or with meeting others people who are arriving at the airport terminal on different flights.

As desired, other types of upload content 510, including application software, such as media player programs or games, and/or textual materials, such as forms, reference materials, or other documents, can be provided by the content control system 200 for storage on the server system 310. Application software files typically are provided in an executable (EXE) format, and exemplary file formats for the textual files include document text file (DOC) format, Portable Document Format (PDF), and text file (TXT) format. Although selected formats have been discussed above with reference to the audio viewing content and video viewing content for purposes of illustration, the selected formats are merely exemplary and not exhaustive. It is understood that the upload content 510 thereby can be provided in any suitable conventional format.

The vehicle information system 300 is shown in FIG. 2A as being coupled with, and in communication with, the content control system 200 via a communication cable 550. Being configured to couple with a communication port 320A provided on the automobile 810, the communication cable 550 permits the exchange of communication signals 500 between the content control system 200 and the server system 310. The upload data 510 thereby can be provided to, and stored by, the server system 310. As desired, a transceiver system 330A can be disposed between the communication port 320A and the server system 310 to facilitate the exchange of communication signals 500. Once stored on the server system 310, the upload content 510 can be selectable viewed via one or more passenger interface systems 340 of the vehicle information system 300. In the manner discussed in more detail in the aforementioned co-pending U.S. patent application, entitled "SYSTEM AND METHOD FOR DOWNLOADING FILES," Ser. No. 10/772,565, filed on Feb. 4, 2004, the passenger interface systems 340 can communicate with the server system 310 by way of a wired and/or wireless communication network 350.

The passenger interface systems 340 can be associated with the passenger seats 820 of the automobile 810 and can include an input system (not shown), such as a keyboard, a keypad, and/or a pointing device, for permitting passengers to select desired viewing content from the upload content 510 available on the server system 310. The selected upload content 510 can be presented in any appropriate manner via the passenger interface systems 340. Conventional passenger interface systems 340 can include one or more overhead display systems (not shown) and/or seatback display systems (not shown) for visually presenting a video portion of the selected upload content 510; whereas, an audio portion of the selected upload content 510 can be audibly presented via one or more cabin speakers (not shown) and/or headphones in communication with an audio output port of the vehicle information system 300.

Similarly, the vehicle information system 300 can store the download content 520 on the server system 310 during travel and provide the download content 520 to the content control system 200 upon arrival at the travel destination. Being compiled during travel, the download content 520 can comprise any conventional type of system information, such as performance data, system usage data, and/or passenger transaction data, associated with the vehicle information system 300 and/or the vehicle 800. The download content 520 can be provided in any appropriate format and preferably is provided in any conventional compressed format to facilitate the exchange of the communication signals 500 in the manner set forth above with reference to the upload content 510. Depending, for instance, on the system capacity and/or the nature of the system information, the download content 520 can supplement, update, and/or replace the system information previously downloaded from the server system 310. As desired, the download content 520 can comprise system information compiled since the previous content download. Although the upload content 510 and the download content 520 can be exchanged at different times, the content control system 200 typically provides the upload content 510 to the vehicle information system 300 and receives the download content 520 from the vehicle information system 300 during a single data exchange session.

The vehicle information system 300 is illustrated as being installed on an aircraft 830 in FIG. 2B. When installed on the aircraft 830, the vehicle information system 300 can comprise any conventional type of avionics information system; whereas, the upload content 510 and the download content 520 can be any type of information content suitable for use in conjunction with such avionics information systems. The vehicle information system 300 can include a server system 310, such as a media server system, for receiving the upload content 510 from the content control system 200 and/or providing the download content 520 to the content control system 200 in the manner discussed above with reference to FIG. 2A. Illustrated as being in wireless communication with the content control system 200, the vehicle information system 300 of FIG. 2B can include an antenna system 320B and a transceiver system 330B for facilitating exchanges of communication signals 500. The upload content 510 and the download content 520 thereby can be exchanged between the content control system 200 and the server system 310.

FIG. 2B illustrates the vehicle information system 300 as being provided substantially in the manner discussed in more detail above with reference to FIG. 2A. For example, the vehicle information system 300 of FIG. 2B includes a wired and/or wireless communication network 350 for permitting a plurality of passenger interface systems 340 to communicate with the server system 310. Passengers thereby can be permitted to select desired viewing content from the upload content 510 available on the server system 310. The selected upload content 510 can be presented in any conventional manner via the passenger interface systems 340. As set forth above, the vehicle information system 300 likewise can compile and store the download content 520 on the server system 310 during travel. The download content 520 can comprise any conventional type of system information, such as performance data, system usage data, and/or passenger transaction data, associated with the vehicle information system 300 and/or the vehicle 800 and can be provided to the content control system 200, for instance, upon arrival at the travel destination.

As desired, the passenger seats 820 of the vehicle 800 can be divided into a suitable number of seat groups 820A, 820B. For purposes of illustration, the seat group 820A can be associated with seats 820 for the flight crew; whereas, the passenger seats 820 for non-crew passengers can comprise the seat group 820B. The passenger seats 820 in the seat group 820B likewise can be further divided into a first class passenger seat group 820B' and a coach class passenger seat group 820B" as illustrated in FIG. 2B. The functionality of the passenger interface systems 340 associated with the three seat groups 820A, 820B', and 820B" can differ.

For example, since the driver of the automobile 810 of FIG. 2A, like the pilot of the aircraft 830 of FIG. 2B, should pay attention to external travel conditions, the passenger interface system 340 associated with the seat group 820A likely does not include a video display system; whereas, the passenger interface system 340 associated with the seat group 820B can include video display systems. Similarly, the input system for the passenger interface system 340 of the seat group 820A can be configured to mute the audio systems for each of the passenger interface systems 340 in the vehicle 800. Further, the functionality of the passenger interface systems 340 for the first class passenger seat group 820B' can differ from the functionality of the passenger interface systems 340 for the coach class passenger seat group 820B". The passenger interface systems 340 associated the first class passenger seat group 820B' can, for example, access premium content that is not available to the passenger interface systems 340 associated the coach class passenger seat group 820B" without payment of a fee.

Figure 3:
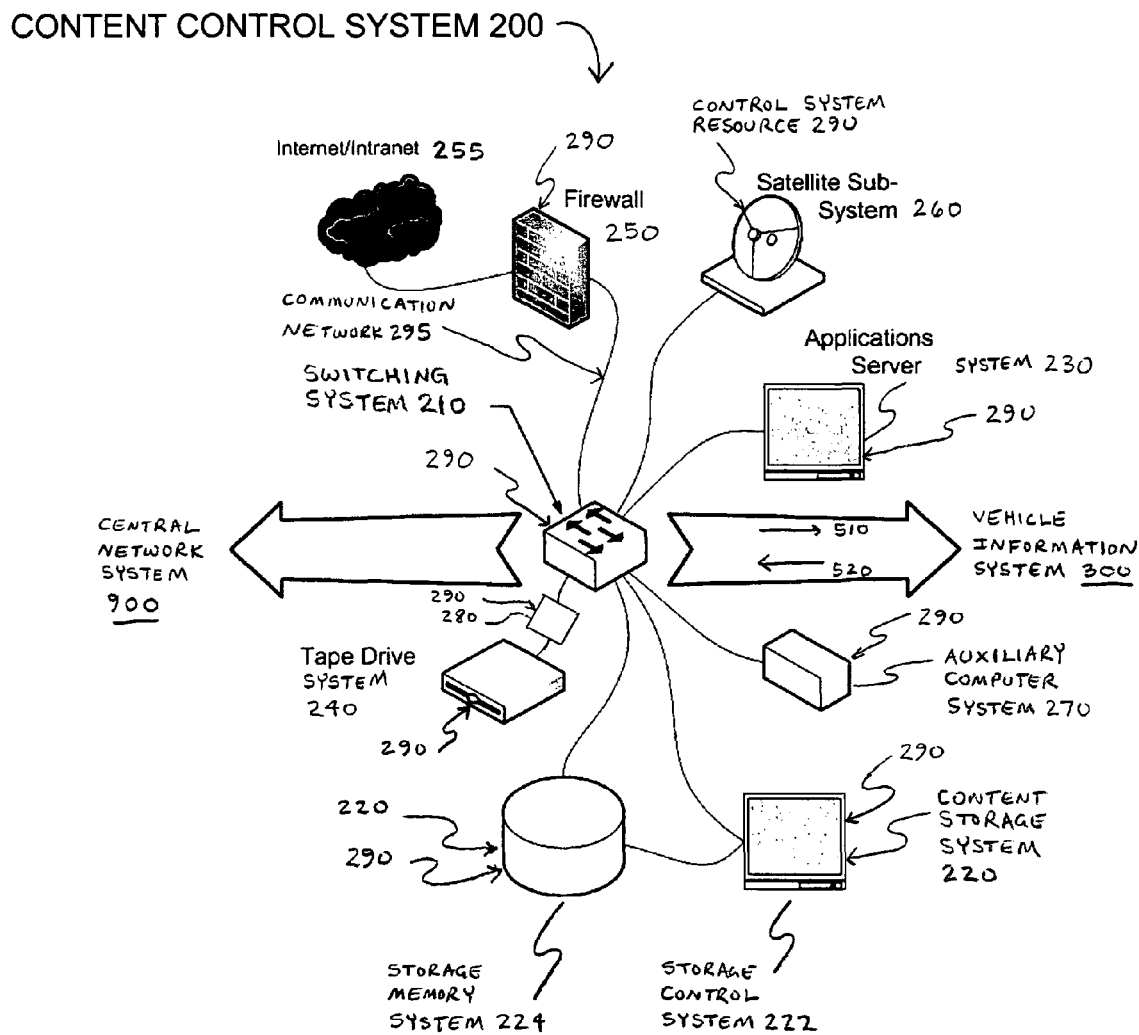
FIG. 3 is an exemplary block diagram illustrating an embodiment of the content control system of FIG. 1.

One exemplary embodiment of the content control system 200 is illustrated in FIG. 3. In the manner discussed in more detail above with reference to FIG. 1, the content control system 200 can provide content storage and control functionality for the content management system 100. The content control system 200 is shown as comprising a plurality of control system resources 290 that are configured to communicate via a communication network 295. Stated somewhat differently, the plurality of system resources 290 of the content control system 200 can form the communication network 295 for providing communications among the system resources 290. The communication network 295 likewise can permit the content control system 200 to communicate with the vehicle information system 300, the Internet 255, and/or a central network system 900, such as an airport terminal network 720 (shown in FIG. 5B).

The communication network 295, for example, can be provided as a conventional wired and/or wireless communication network, including a telephone network, a local area network (LAN), a wide area network (WAN), a campus area network (CAN), personal area network (PAN) and/or a wireless local area network (WLAN), of any kind. Exemplary wireless local area networks include wireless fidelity (Wi-Fi) networks in accordance with Institute of Electrical and Electronics Engineers (IEEE) Standard 802.11 and/or wireless metropolitan-area networks (MANs), which also are known as WiMax Wireless Broadband, in accordance with IEEE Standard 802.16. Preferably being configured to support high data transfer rates, the communication network 295 preferably comprises a high-speed Ethernet network, such as any type of Fast Ethernet (such as 100Base-X and/or 100Base-T) communication network and/or Gigabit (such as 1000Base-X and/or 1000Base-T) Ethernet communication network, with a typical data transfer rate of at least approximately one hundred megabits per second (100 Mbps). To achieve high data transfer rates in a wireless communications environment, free-space optics (or laser) technology, millimeter wave (or microwave) technology, and/or Ultra-Wideband (UWB) technology can be utilized to communicate with selected system resources 290, the vehicle information system 300, the Internet 255, and/or a central network system 900, as desired.

The communication network 295 likewise can be provided with any appropriate topology, protocol, and/or architecture. Comprising a geometric arrangement of the system resources 290, common network topologies include mesh, star, bus, and ring network topologies. The topology of the communication network 295 likewise can comprise a hybrid of the common network topologies, such as a network tree topology. Network protocols define a common set of rules and signals by which the system resources 290 can communicate via the communication network 295. Illustrative types of network protocols include Ethernet and Token-Ring network protocols; whereas, peer-to-peer and client/server network architectures are examples of typical network architectures. It will be appreciated that the network system types, topologies, protocols, and architectures identified above are merely exemplary and not exhaustive.

As shown in FIG. 3, the system resources 290 can include a central switching (or routing) system 210 for facilitating communications among the system resources 290, the vehicle information system 300, the Internet 255, and/or a central network system 900. The central switching system 210 can be provided as any conventional type of switching (or routing) system and preferably comprises a high speed switching system. If configured to support communications in accordance with the Gigabit (such as 1000Base-X and/or 1000Base-T) Ethernet standard, for example, the central switching system 210 can negotiate appropriate communication data rates, including ten, one hundred, or one thousand megabits per second (10/100/1000 Mbps), and/or a duplex mode, such as a half duplex mode and/or a full duplex mode, with each of the system resources 290.

The central switching system 210 can directly couple with a selected system resource 290 and/or indirectly couple with the selected system resource 290 via one or more intermediate system resources 290, such as a firewall 250 and/or a conversion system 280, as illustrated in FIG. 3. Preferably providing wired communications with each of the system resources 290 within its physical range, the central switching system 210 can be configured to support wired and/or wireless communications with the system resources 290 in the manner set forth above with reference to the communication network 295. For example, the central switching system 210 can support the wired communication with the system resources 290 via one or more copper connections and/or fiber optic connections. The fiber optic connections can be trunked, as desired.

The content control system 200 can include one or more content storage systems 220 for providing content storage and at least one server system, such as an application server system 230, for providing control functionality for the content management system 100. Each content storage system 220 is shown as being coupled with, and configured to communicate with, the central switching system 210, preferably via a high-speed gigabit fiber communication connection. The content storage system 220 has sufficient resources for storing the content associated with the content management system 100. The content storage system 220 likewise can store and provide other types of information, including instruction code, such as software or firmware, intermediate calculation results, and other information associated with the content control system 200 and/or download content 520, such as performance data related to the current and/or historical operational status, as provided by the vehicle information system 300.

Preferably comprising a non-volatile memory system, the content storage system 220 can comprise any suitable type of memory system, such as any electronic, magnetic, and/or optical storage media, without limitation. Exemplary storage media can include one or more static random access memories (SRAMs), dynamic random access memories (DRAMs), electrically-erasable programmable read-only memories (EEPROMs), FLASH memories, hard drives (HDDs), compact disks (CDs), and/or digital video disks (DVDs) of any conventional kind. The content storage system 220 is shown in FIG. 3 as comprising a storage control system 222 and a storage memory system 224. As desired, the content storage system 220 can include one or more conventional mass storage systems, such as storage area network (SAN) system and/or a network-attached storage (NAS) system.

If the content storage system 220 forms a conventional storage area network (SAN), for example, the storage memory system 224 can be provided as large-capacity, fiber optic, high-speed disk arrays for content and data storage; whereas, the storage control system 222 can include dual-redundant SAN controllers to ensure high system availability. Illustrative disk arrays have a net storage capacity of up to three Terabytes or more and can be configured as one or more redundant disk arrays, such as redundant arrays of inexpensive disks (RAIDs) and/or Zero+1, to provide high disk failure fault tolerance and disk hot-swap capability. For example, a suitable redundant disk array can comprise RAID Level 5, which provides data stripping at the byte level and stripe error correction information for excellent performance and good fault tolerance.

As desired, the content control system 200 and/or the content storage system 220 likewise can include one or more tape drive systems 240, as shown in FIG. 3, for providing high-capacity content loading for the content management system 100. Each tape drive system 240 is shown as being coupled with, and configured to communicate with, the central switching system 210. The content control system 200 preferably has at least two redundant tape drive systems 240 to ensure high content availability. Having sufficient resources for storing the associated content, the tape drive systems 240 can be provided as any conventional type of tape drive system. The tape drive systems 240 preferably have data transfer rates of up to thirty-two megabits per second (32 Mbps) or more.

The application server system 230 provides control functionality for the content management system 100. To ensure redundancy, the content control system 200 preferably has at least two application server systems 230. Each application server system 230 can be provided as a conventional computer server system and can be configured to execute one or more applications, scripts, and/or tools to effectively manage the content management system 100, including the associated data, media, and/or content. In the manner discussed above with reference to the content storage system 200, the application server systems 230 are illustrated in FIG. 3 as being coupled with, and configured to communicate with, the central switching system 210, preferably via high-speed gigabit fiber communication connections. Although shown and described with reference to FIG. 3 as being provided as substantially separate system resource 290 for purposes of illustration, the functionality of two or more of the system resource 290 can be combined into a single system resource 290, and/or the functionality of a selected system resource 290 can be further subdivided into two or more system resource 290, as desired.

It will be appreciated that the system resources 290 shown and described with reference to FIG. 3 are merely exemplary and are not exhaustive. For example, the content control system 200 further can include other conventional types of system resource 290, as desired. As illustrated in FIG. 3, the content control system 200 includes one or more firewalls 250, satellite sub-systems 260, and/or auxiliary computer systems 270. The firewalls 250, the satellite sub-systems 260, and/or the auxiliary computer systems 270 can be configured to communicate with the central switching system 210 in the manner set forth in more detail above. Each firewall 250 provides security for the content control system 200 and, as desired, can include a virtual private network (VPN) appliance. Thereby, the content control system 200 advanta-geously can provide controlled remote access capability and can include a gateway for providing access to an intranet and/or the Internet 255.

The satellite sub-systems 260 each can be configured to permit hands-off content loading into the content control system 200, and, as desired, can permit for direct broadcast satellite (DBS) television and/or satellite radio content acquisition for recording and selective deployment to the vehicle information system 300. The auxiliary computer systems 270 can enable a user (not shown) to pre-load user-specific content to the vehicle information system 300. For example, the user-specific content can be pre-loaded onto one or more spare hard disk drive array (HDDA) systems and/or file server (FS) systems of the vehicle information system 300. The auxiliary computer systems 270 each can be provided at a location remote from the central switching system 210. In the manner discussed in more detail above, one or more of the auxiliary computer systems 270 preferably communicates with the central switching system 210 via a high-speed communication connection such that the user-specific content can be provided to the vehicle information system 300 at a high data transfer rate.

As shown in FIG. 3, the content control system 200 likewise can communicate with a central network system 900 associated with the location at which the content control system 200 is installed. For example, if the content control system 200 is located at an airport terminal 700 (shown in FIG. 5B), the central network system 900 can comprise an airport terminal network 720 (shown in FIG. 5B). The central network system 900 can be coupled with, and be configured to communicate with, the central switching system 210 in the manner discussed in more detail above with reference to the control system resources 290. Thereby, the central network system 900 and the content control system 200 can exchange information, such as fight departure and arrival time data and/or passenger data, preferably via a high-speed gigabit fiber communication connection. The information provided by the central network system 900 can be selectably provided to the vehicle information system 300; whereas, the central network system 900 can receive selected information from the content control system 200 and/or the vehicle information system 300.

The communication network 295 can include any conventional type of system resource 290. For example, the communication network 295 can include one or more conversion systems 280 for converting signals in a first communication protocol to a communication protocol. As discussed above, the central switching system 210 can directly couple with a selected system resource 290 and/or indirectly couple with the selected system resource 290 via one or more intermediate system resources 290. The tape drive system 240 is illustrated in FIG. 3 as being coupled with the central switching system 210 via the conversion systems 280. Therefore, if the tape drive system 240 and the central switching system 210 are configured to communicate via different communication protocols, the conversion system 280 can convert communications signals provided by the tape drive system 240 into communications signals that are compatible with the central switching system 210. The conversion system 280 likewise can convert communications signals provided by the central switching system 210 into communications signals that are compatible with the tape drive system 240. The conversion systems 280 thereby can facilitate communications between the tape drive system 240 and the central switching system 210.

The conversion system 280 can comprise any suitable type of conversion system for converting between any conventional types of communication signals. One or more conversion systems 280 can be provided for facilitating communications with the vehicle information system 300 and/or the central network system 900. The conversion system 280, for example, can be configured to receive the download content 520 in a high-speed gigabit fiber communication protocol from the vehicle information system 300 and to convert the download content 520 to a high-speed gigabit copper communication protocol for communication to the central switching system 210. The central switching system 210 likewise can provide the upload content 510 in the high-speed gigabit copper communication protocol, which can be converted by the conversion system 280 into the high-speed gigabit fiber communication for receipt by the vehicle information system 300. As desired, the central switching system 210 can provide a plurality of communication connections, each supporting a different wired and/or wireless communication protocol, such that the central switching system 210 can communicate with a selected vehicle information system 300. The content control system 200 thereby can be configured to communicate with a wide range of vehicle information systems 300 and/or to support a variety of diverse communication protocols.

Figure 4:
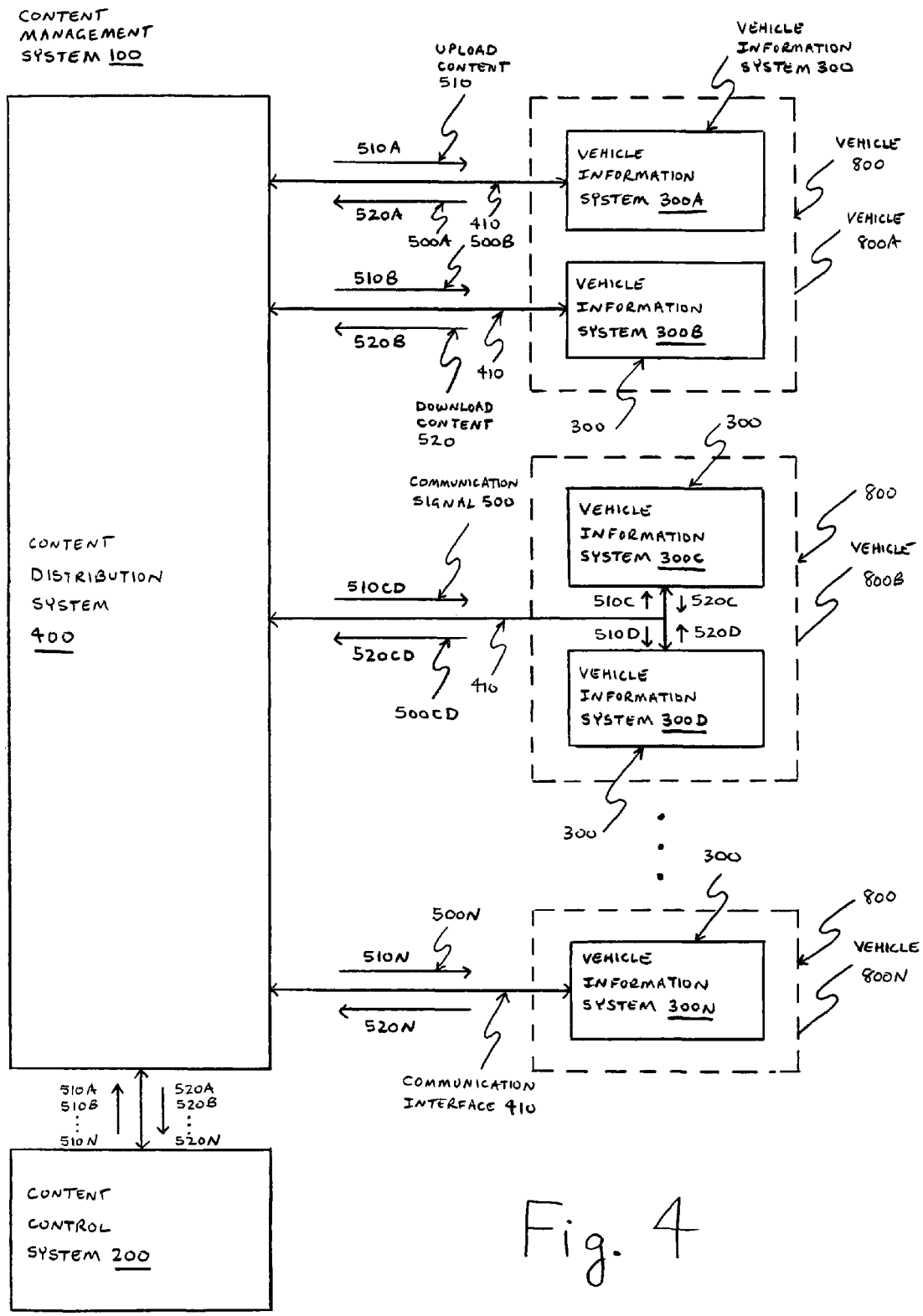
FIG. 4 is an exemplary block diagram illustrating an alternative embodiment of the content management system of FIG. 1 in which the content control system is configured to communicate with a plurality of vehicle information systems via a content distribution system.

FIG. 4 illustrates the content control system 200 as being configured to communicate with a plurality of vehicle information systems 300. The content control system 200 can communicate directly with the vehicle information systems 300 in the manner discussed above and/or indirectly via a content distribution system 400. As shown in FIG. 4, the vehicle information systems 300 can be installed on a plurality of vehicles 800 with each vehicle 800 having at least one vehicle information system 300. The communication signals 500 can be exchanged between the content control system 200 and the plurality of vehicle information systems 300 in any conventional manner.

For example, a first vehicle information system 300A and a second vehicle information system 300B are shown as being installed in vehicle 800A. The content control system 200 provides substantially separate upload content signals 510A, 510B to the vehicle information systems 300A, 300B and receives substantially separate download content signals 520A, 520B from the vehicle information systems 300A, 300B. Vehicle 800B likewise includes a pair of vehicle information systems 300C, 300D, which receive a composite upload content signal 510CD from the content control system 200 and provide a composite download content signal 520CD to the content control system 200. The content management system 100 thereby can provide ensured comprehensive content management for a plurality of vehicle information systems 300 installed on one or more vehicles 800.

The content distribution system 400 can comprise a wired and/or a wireless content distribution system and can be provided in any conventional manner, including in the manner discussed in more detail above with reference to the communication network 295 (shown in FIG. 3). Being configured to facilitate exchanges of communication signals 500 between the content control system 200 and the vehicle information systems 300, the content distribution system 400 can receive upload content 510A, 510B, ..., 510N from the content control system 200 and distribute the upload content 510A, 510B, ..., 510N among the vehicle information systems 300A, 300B, ..., 300N. The content distribution system 400 likewise can receive download content 520A, 520B, ..., 510N from the vehicle information systems 300A, 300B, ..., 300N and can provided the download content 520A, 520B, ..., 510N to the content control system 200.

Communications between content distribution system 400 and the vehicle information systems 300A-N can be provided in any conventional manner and can be facilitated via one or more communication interfaces 410. Each communication interface 410 can include one or more hardware components and/or software components and is configured to communicate with, the central switching system 210 (shown in FIG. 3), preferably via a high-speed gigabit fiber communication connection. The high-speed gigabit fiber communication connection can be provided via a fiber strand assembly having a plurality of fiber strands each being configured to support data rates of up to one gigabit per second (1 Gbps) or more. The fiber strand assembly may be trunked to aggregate data transfer rates, as desired. If four fiber strands are trunked, for example, the aggregate data transfer rate for the four trunked strands is approximately four gigabits per second (4 Gbps).

The communication interface 410 likewise can include one or more network switch systems (not shown) for receiving upload content 510 from the high-speed gigabit fiber communication connection and for providing the upload content 510 to the relevant vehicle information system 300. Each network switch system can be provided in any convention manner, including the manner discussed above with reference to the central switching system 210 (shown in FIG. 3). Being configured with any suitable topology, protocol, and/or architecture, the network switch systems preferably are configured in a "star topology" from the content control system 200 to provide fault isolation. The network switch systems of the communication interface 410 can support wired communications with the relevant vehicle information system 300 and/or wireless communications with the relevant vehicle information system 300, as desired.

If wired communications with the vehicle information system 300 are supported, the communication interface 410 can comprise a wired communication interface 420 (shown in FIGS. 5A-B), such as a cable system 425 (shown in FIGS. 5A-B), the wired communication interface 420 preferably includes a metallic communication connection, such as a copper communication connection. The cable system 425 can be provided in any conventional manner and preferably comprises a hardened, CAT-6 Ethernet harness assembly and couples the content control system 200 and the vehicle information system 300. The connection can be made at any suitable location on the vehicle 800. For example, if the vehicle 800 comprises an aircraft 820 (shown in FIG. 2B), the cable system 425 can be routed with an aircraft power cable (not shown) and be configured to couple with an external power connector panel of the aircraft 820. The cable system 425 preferably likewise includes a quick-disconnect harness repair design characteristics for maintenance.

Although a fiber-based communication connection may be used, a metallic communication connection is preferred because the connection to the aircraft would be a function of the technicians who couple the cable system 425 to the vehicle 800. As such, the physical communication interface 410 should be reliable, easily repaired, and inexpensive. Metallic communication connections typically satisfy each of these requirements far more readily than fiber-based communication connections. The cable system 425 likewise generally can hang in free space and may be subjected to both weather and foreign object damage inherent in the environment. Metallic communication connections generally are more resistant to influence from these elements than are fiber-based communication connections.

Figure 5A:
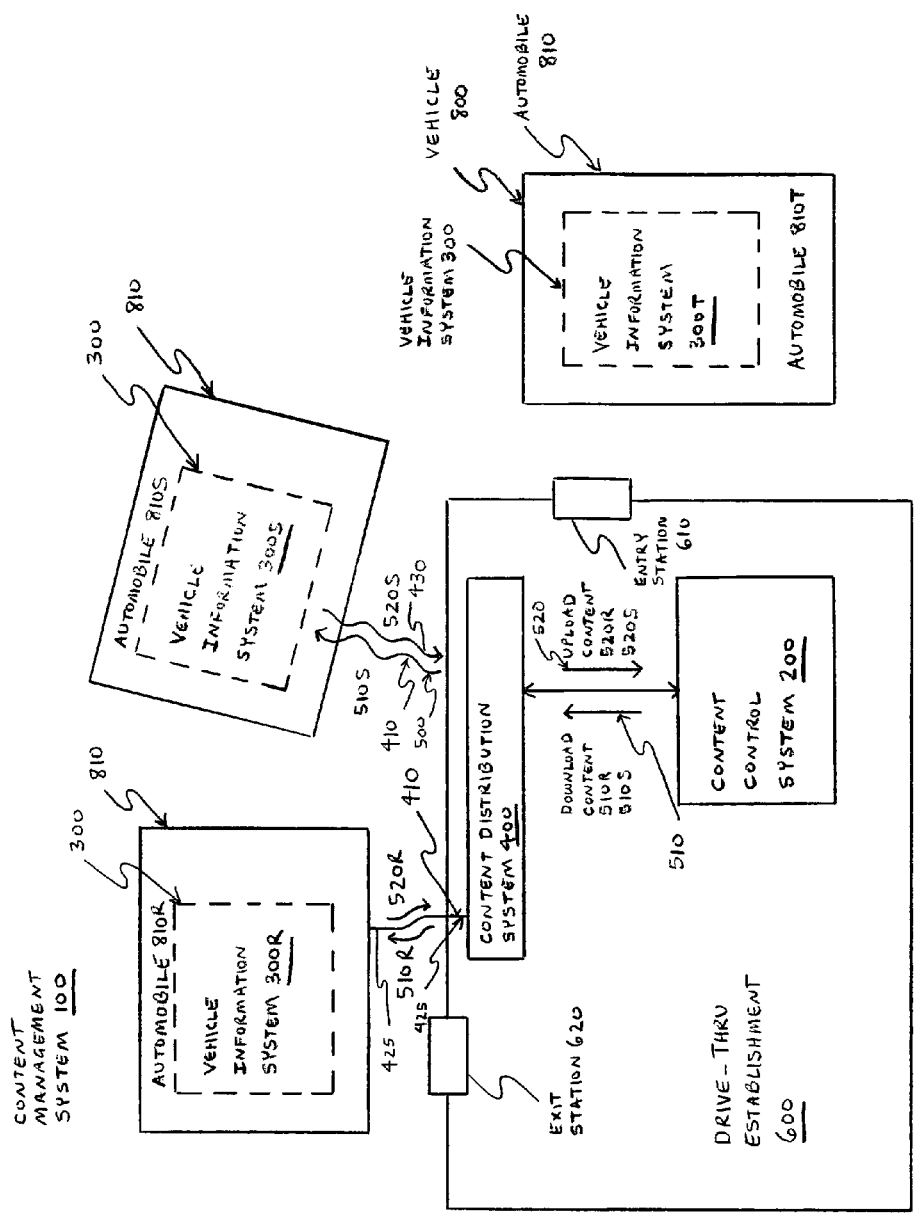
FIG. 5A is an exemplary block diagram illustrating an alternative embodiment of the content management system of FIG. 4 in which the content control system is installed at a drive-through establishment.
Figure 5B:
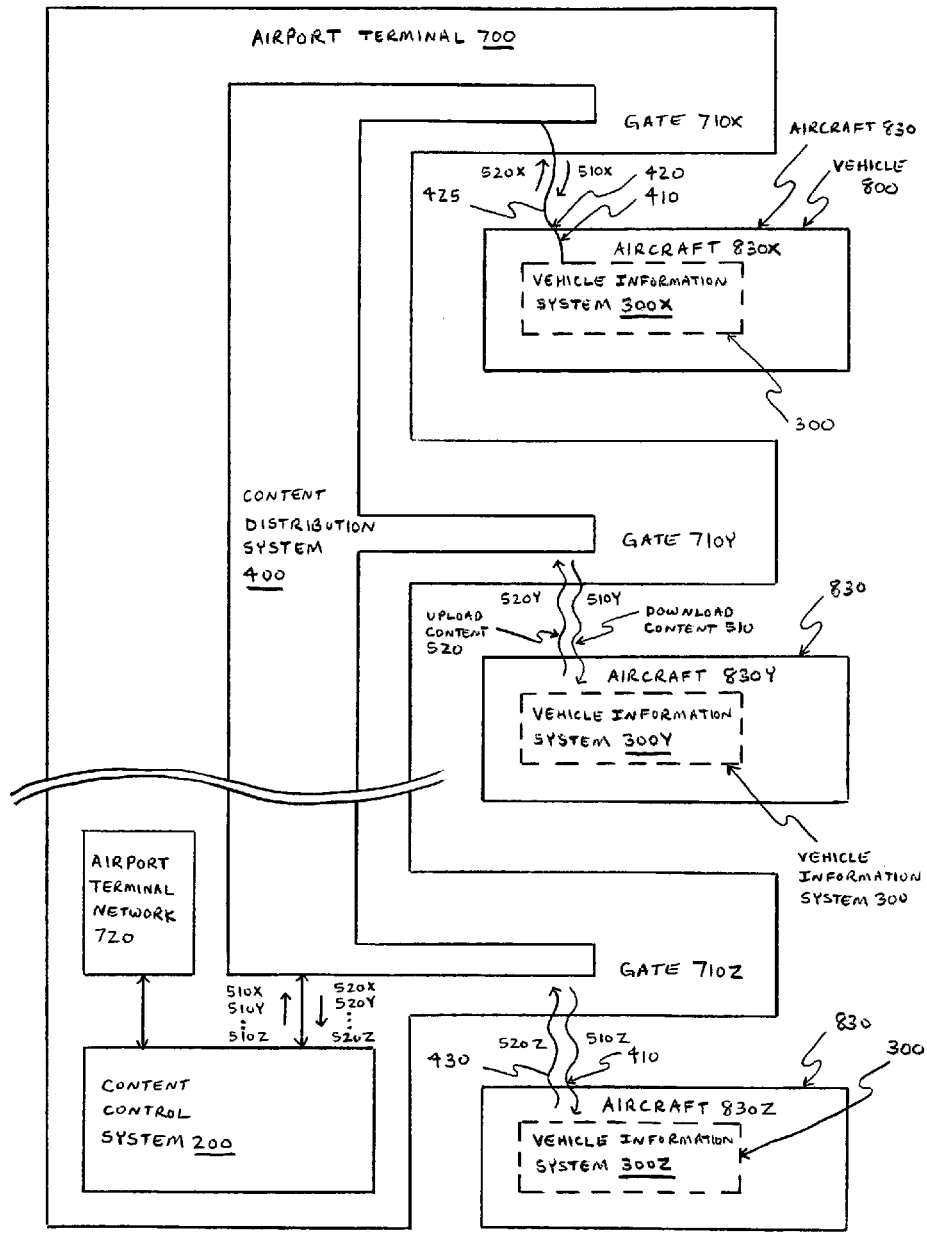
FIG. 5B is an exemplary block diagram illustrating another alternative embodiment of the content management system of FIG. 4 in which the content control system is installed at an airport.

As desired, one or more of the communication interfaces 410 advantageously can support wireless communications with the vehicle information system 300 and can include a wireless communication interface 430 (shown in FIGS. 5A-B). The wireless communication interface 430 can be provided via conventional wireless technology. For example, the wireless communication interface 430 can comprise Ultra-Wideband (UWB) technology for providing communications between the content distribution system 400 and the selected vehicle information systems 300A-N in the manner set forth in more detail above. Ultra-Wideband (UWB) technology is designed to communicate large amounts of data, such as content, with a relatively low transmit power level and over distance ranges that are consistent with the generally short distances formed between the content distribution system 400 and the relevant vehicle 800.

Software components of the content management system 100 can include one or more network, messaging, and/or server tools, for monitoring, maintaining, and/or reporting the operational status and/or configuration of the hardware and associated operating software for the content management system 100. These tools can include "alert" capability to send alert messages in a suitable-message format, such as a Simple Mail Transfer Protocol (SMTP) message format, when the content management system 100 fails to attain one or more performance parameters. Rapid system repair thereby can be ensured in the event of one or more system failures. The performance of the content management system 100 likewise can be presented on a web-based monitoring system, such as via a website. Maintenance functions can be access-controlled and accessible via authorized maintenance personnel.

A consolidated, web-based application and database can provide a data management function for managing and/or controlling content. Illustrative types of content that can be managed and/or controlled via the data management function include stored content stored by the content control system 200, upload content 510 being provided to the vehicle information systems 300, and/or download content 520 being received from the vehicle information systems 300. The data management function likewise can be configured to manage and/or control any type of content, such as any system reporting, system software configuration management, and transactional data (credit cards, inventory, etc.), stored on the vehicle information systems 300. If the vehicle information systems 300 is installed aboard an aircraft 820 (shown in FIG. 2B), the data management function can support any data or other content communications associated with an Aircraft Ground Information System (AGIS)-type function. In the manner discussed above, the data management function preferably are access-controlled and accessible by authorized personnel.

As desired, the content management system 100 can include an interactive software platform for permitting content updates without interactive software updates. The content stored in the vehicle information system 300 can be updated at any time. One or more file management utilities also can be provided to support and optimize a variety of file tasks. For vehicle information systems 300 installed aboard aircraft 820, the content management system 100 can be configured to manage flight deck-related content (e.g., Electronic Flight Bag). The flight deck-related content preferable is stored in a segmented, secure file storage area of the vehicle information system 300. Existing hardware and/or software may be sufficient to provide the segmented, secure file storage area. The existing hardware can comprise any convention type of storage system in manner discussed above with reference to the content storage system 220 (shown in FIG. 3) and can include one or more mass storage systems, such as a media server system, a file server system, and/or a Cabin Memory Extension Unit (CMEU). Preferably, the storage system includes media server system of an aircraft passenger in-flight entertainment system (IFE) installed aboard the installed aboard aircraft 820. Additional hardware, such as a Firewall & Flight Deck File Server, can be provided under appropriate circumstances such as if, for example, stringent security standards exist for flight deck-related content.

In the manner set forth above, the content management system 100 can be configured to provide ensured comprehensive content management for the vehicle information systems 300. The content control system 200 is configured to control the content management system 100 and can provide one or more content management services for the vehicle information system 300. The owner and/or operator of a vehicle 800 (or a fleet of vehicles 800) that includes one or more vehicle information systems 300 thereby can update the vehicle information systems 300 by uploading upload content to, and/or downloading download content from, the vehicle information systems 300 via the content control system 200. For example, the operator of the vehicle 800 can pay a subscription fee to an operator of the content management system 100 to provide such content management services for the vehicle 800. Illustrative subscription fees can include periodic subscription fees and/or subscription fees based upon usage and/or a number of vehicles 800 to be serviced under the subscription.

The content control system 200 can be associated with a predetermined geographical site. The characteristics, such as the size and/or location, of the predetermined geographical site can be selected based, for example, upon the type of vehicle 800 to be serviced. Turning to FIG. 5A, the content control system 200 is shown as being configured to service automobiles 810 having vehicle information systems 300 and as comprising a drive-through establishment 600. Although individually owned and operated automobiles 810 can be serviced, the drive-through establishment 600 preferably includes a content control system 200 for servicing fleets of automobiles 810, such as taxicabs and/or rental cars.

The content control system 200 of FIG. 5A can provide upload content 510, such as driving directions and/or maps, associated with a proposed travel route and/or entertainment content. The upload content 510 is stored via the vehicle information systems 300 of the automobiles 810, and the passengers can access the upload content 510 during travel. In the manner discussed above, information likewise can be stored in vehicle information systems 300 during travel and can be downloaded to the content control system 200 when the automobiles 810 next visit the drive-through establishment 600. The information can include performance data for the automobiles 810 and/or operational data, such as travel route data and/or driving in excess of the speed limit, related to the usage of the automobiles 810.

Automobile 810S illustrates a wireless communication between the content control system 200 and the vehicle information system 300S of the automobile 810S. As the automobile 810S travels from the entry station 610 to the exit station 620 of the drive-through establishment 600, the content control system 200 and the vehicle information system 300S begin to communicate. The content control system 200 thereby can automatically provide selected upload content 510S to the vehicle information system 300S of the automobile 810S and/or receive selected download content 520S from the vehicle information system 300S as the automobile 810S approaches the exit station 620. Upon reaching the exit station 620, the vehicle information system 300S preferably is updated, and any associated fee can be paid at the exit station 620.

The automobile 810T is shown as being adjacent to an entry station 610 upon entering the drive-through establishment 600 upon the completion of travel. As desired, the operator of the automobile 810T can provide identifying information, such as an account number and/or a password, at the entry station 610. The operator of the automobile 810T can select content to be uploaded to the vehicle information system 300T of his automobile 810T at the entry station 610 and/or can proceed to an exit station 620 of the drive-through establishment 600. Through a wired and/or wireless exchange of communication signals 500, the content control system 200 can communicate with the vehicle information system 300T, providing the selected upload content 510T to the vehicle information system 300T and/or receiving selected download content 520T from the vehicle information system 300T.

The content control system 200 likewise can be associated with an airport terminal 700 as illustrated in FIG. 5B. The airport terminal 700 includes a plurality of gates 710X-Z that are configured to service aircraft 820X-Z with vehicle information systems 300X-Z. The content control system 200 thereby can provide upload content 510, including entertainment content such as television programming and/or mapping information, from the control system resources 290 (shown in FIG. 3) and/or travel information content, such as fight departure and arrival time data and/or passenger data, from the airport terminal network 720. During travel, the upload content 510 can be stored via the vehicle information systems 300X-Z for passenger access, and/or additional information can be compiled and stored in vehicle information systems 300X-Z in the manner set forth in more detail above. The compiled information can be downloaded to the content control system 200 when the aircraft 820X-Z land at the airport terminal 700 and arrive at the relevant gates 710X-Z.

As discussed above, the content control system 200 can communicate with the vehicle information system 300X-Z. The selected upload content 510X-Z thereby can be provided from the content control system 200 to the vehicle information systems 300X-Z, and/or the content control system 200 can receive the selected download content 520X-Z from the vehicle information system 300X-Z. For example, a wired exchange of communications signals 500 is illustrated by the vehicle information systems 300X; whereas, the vehicle information systems 300Y communicates with the content control system 200 via a wireless exchange of exchange of communications signals 500.

Figure 6:
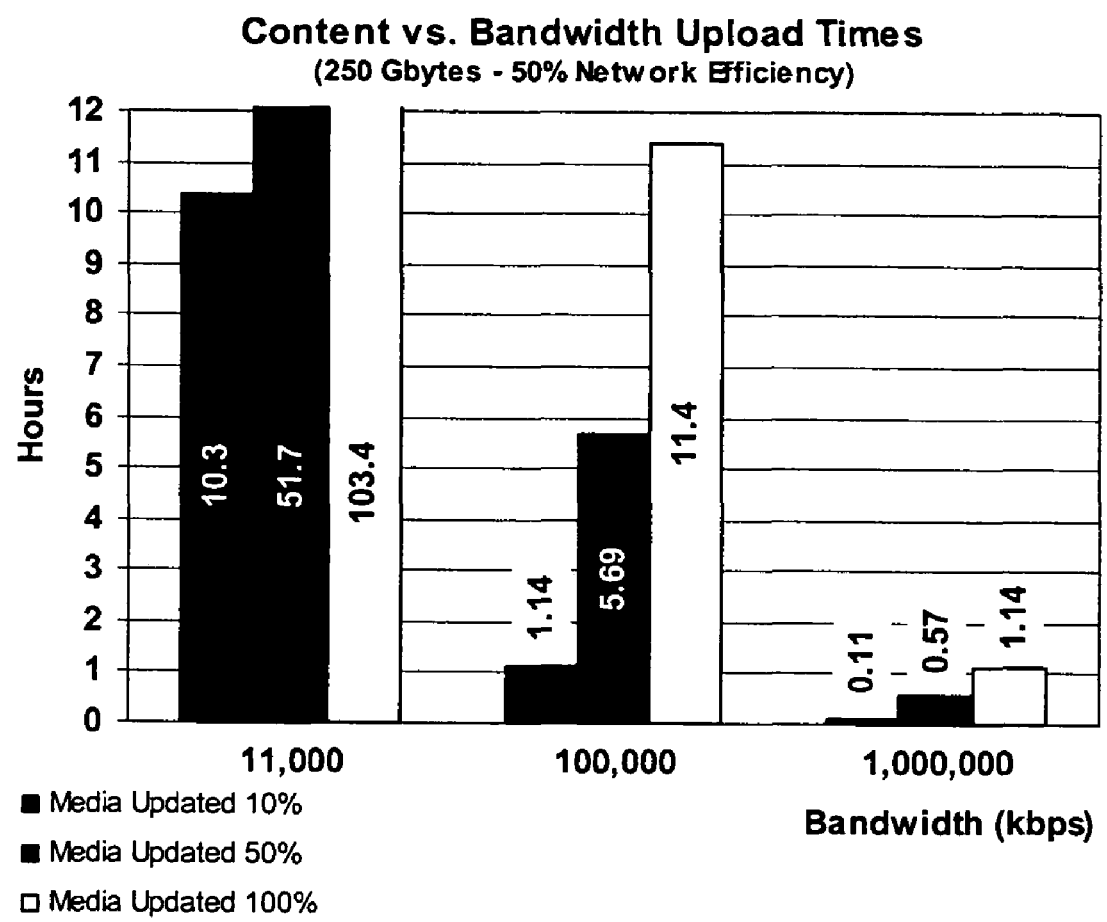
FIG. 6 is an exemplary chart illustrating the upload timing performance for the data management system of FIG. 1.

An exemplary chart is shown in FIG. 6 that illustrates that upload timing typically is a function of the volume of upload content 510 (shown in FIG. 1) to be uploaded for a given media load event versus the available bandwidth for uploading the upload content 510. It will be appreciated that, as desired, a one gigabit per second (1 Gbps) communication port can be used. The chart displays the results of a 250 GB (100%), 125 GB (50%), and 25 GB (10%) load over the content management system 100 at three representative data upload rates: one gigabit per second (1 Gbps), one hundred megabits per second (100 Mbps), and eleven megabits per second (11 Mbps). The three representative data upload rates are illustrated for comparison purposes. The communication network is presumed to operate at fifty percent (50%) data transport efficiency. The chart clearly demonstrates the value of the content management system 100 for content loading purposes.

As desired, the efficiency and economy of the content management system 100 can be further improved by use of incremental (partial) content uploads. A single two hour movie (encoded at 3.5 Mbps bit rate), for example, could upload in less than one minute at a data upload rate of one gigabit per second (1 Gbps) and in less than eight and one-half minutes at the one hundred megabits per second (100 Mbps) data upload rate. Conversely, at wireless speeds with the eleven megabits per second (11 Mbps) data upload rate, the same movie will require approximately one and one-third hours to upload.

The various embodiments disclosed herein are susceptible to various modifications and alternative forms, and specific examples thereof have been shown by way of example in the drawings and are herein described in detail. It should be understood, however, that the various embodiments disclosed herein are not to be limited to the particular forms or methods disclosed, but to the contrary, the disclosure is to cover all modifications, equivalents, and alternatives falling within the spirit and scope of the claims.

What is claimed is:

1. A system for provisioning content among a plurality of passenger entertainment systems installed aboard passenger vehicles, each of the passenger entertainment systems having a plurality of passenger interface systems, comprising:

a terrestrial central server system for generating a content load for the passenger entertainment systems based upon a predetermined criteria, the content load identifying preselected entertainment content for distribution among the passenger entertainment systems; and a terrestrial content control system for receiving the content load from said central server system, automatically recognizing new entertainment content identified by the content load, pushing the new entertainment content to the passenger entertainment systems, and dynamically reconfiguring the passenger interface systems to display the new entertainment content for passenger consumption, said content control system being disposed at a travel destination of the passenger vehicles and including:

a content storage system for storing entertainment content including the new entertainment content and having at least one mass storage system;

a central switching system for routing the new entertainment content from said content storage system to a selected passenger entertainment system for presentation during subsequent travel, said central switching system receiving system status data from the selected passenger entertainment system and pushing the system status data to said content storage system for storage, the system status data being compiled by the selected passenger entertainment system during previous travel;

a conversion system disposed between the central switching system and a selected system resource for providing at least a portion of the new entertainment content identified by the content load, said conversion system for converting signals in a first communication protocol from the selected system resource to a second communication protocol suitable for distribution via the central switching system to the selected passenger entertainment system; and an application server system for initiating a communication connection between said central switching system and the selected passenger entertainment system after an associated passenger vehicle arrives at the travel destination, said application server system controlling the pushing of the new entertainment content in the second communication protocol from said content storage system to the selected passenger entertainment system and the providing of the system status data from the selected passenger entertainment system to said content storage system such that the new entertainment content and the system status data are exchanged between said content storage system to the selected passenger entertainment system during a single data exchange session while the associated passenger vehicle is at the travel destination, wherein said central server system and said content control system communicate via a satellite communication system and form a private network for providing comprehensive content management for the entertainment content routed to, and the system status data received from, the passenger entertainment systems.

2. The system of claim 1, wherein the selected system resource comprises a tape drive system.

3. The system of claim 1, wherein said central server system dynamically generates the content load.

4. The system of claim 1, wherein the predetermined criteria includes a travel route of the associated passenger vehicle.

5. The system of claim 1, wherein said central server system is geographically remote from said content control system.

6. The system of claim 1, further comprising a network monitoring system for monitoring an operational status of said content control system and for transmitting an alert message when said content control system fails to attain one or more performance parameters.

7. The system of claim 1, wherein said at least one mass storage system comprises a mass storage system selected from a group consisting of a storage area network system, a network-attached storage system, and a tape drive system for providing high-capacity content loading.

8. The system of claim 1, wherein said central switching system communicates with at least one of said content storage system and said application server system via a high-speed communication connection.

9. The system of claim 8, wherein said high-speed communication connection comprises a high-speed gigabit fiber communication connection.

10. The system of claim 1, wherein said central switching system comprises a high-speed switching system.

11. The system of claim 1, wherein said content control system is disposed at an airport terminal.

12. The system of claim 11, wherein said central switching system is configured to communicate with an airport terminal network associated with the airport terminal.

13. The system of claim 12, wherein said central switching system routes selected terminal content from the airport terminal network to the selected passenger entertainment system and routes the system status data to the airport terminal network.

14. The system of claim 1, wherein the preselected content is selected from a group consisting of mapping information, music, an audio book, a motion picture, television programming, and travel information.

15. The system of claim 1, wherein the system status data comprises system information for the selected passenger entertainment system.

16. The system of claim 15, wherein the system information is selected from a group consisting of performance data, passenger transaction data, and system usage data.

17. The system of claim 1, wherein said content control system communicates with the selected passenger entertainment system via a high-speed communication connection.

18. The system of claim 17, wherein the high-speed communication connection comprises a high-speed wired communication connection.

19. The system of claim 18, wherein the high-speed wired communication connection is selected from a group consisting of a high-speed gigabit fiber communication connection and a copper communication connection.

20. The system of claim 17, wherein the high-speed communication connection comprises a high-speed wireless communication connection.

21. The system of claim 20, wherein the high-speed wireless communication connection utilizes Ultra-Wideband technology for communicating with the selected passenger entertainment system.

22. The system of claim 1, further comprising a gateway for providing Internet content to said central switching system, said central switching system providing selected Internet content to the selected passenger entertainment system.

23. The system of claim 1, wherein the selected system resource comprises a satellite sub-system for providing satellite content to said central switching system, said central switching system providing selected satellite content to the selected passenger entertainment system.

24. The system of claim 23, wherein the selected satellite content is selected from a group consisting of television programming content and radio programming content.

25. The system of claim 1, wherein said application server system provides rights management for the content stored within said content storage system.

26. The system of claim 1, wherein said content control system distributes the preselected entertainment content uniformly among each of the passenger entertainment systems.

27. A method for provisioning content among a plurality of passenger entertainment systems installed aboard passenger vehicles, each of the passenger entertainment systems having a plurality of passenger interface systems, comprising:

providing a terrestrial content control system that includes a content storage system for storing entertainment content including new entertainment content, said content control system being and that is associated with a travel destination of the passenger vehicles, said content source system having a mass storage system and a selected system resource each for providing at least a portion of the new entertainment content;

generating a content load for the passenger entertainment systems based upon a predetermined criteria, the content load being generated via a terrestrial central server system and identifying preselected entertainment content available via said content storage system for distribution among the passenger entertainment systems;

providing the content load to said content control system;

automatically recognizing the new entertainment content identified by the content load; and pushing the new entertainment content to the passenger entertainment systems by:

initiating a communication connection between said central switching system and a selected passenger entertainment system after an associated passenger vehicle arrives at the travel destination;

converting signals in a first communication protocol from the selected system resource to a second communication protocol suitable for distribution to the selected passenger entertainment system;

pushing the new entertainment content in the second communication protocol to the selected passenger entertainment system for presentation during subsequent travel;

dynamically reconfiguring the passenger interface systems to display the new entertainment content for passenger consumption;

receiving system status data from the selected passenger entertainment system, the system status data being compiled by the selected passenger entertainment system during previous travel; and pushing the system status data to said content storage system for storage such that the new entertainment content and the system status data are exchanged between said content storage system to the selected passenger entertainment system during a single data exchange session while the associated passenger vehicle is at the travel destination, wherein said content control system and the central server system communicate via a satellite communication system and form a private network for providing comprehensive content management for the entertainment content routed to, and the system status data received from, the passenger entertainment systems.

28. The method of claim 27, wherein said generating the content load comprises dynamically generating the content load.

29. The method of claim 27, wherein said providing the content load to said content control system comprises providing the content load to said content control system via a satellite communication system.

30. The method of claim 27, further comprising monitoring an operational status of said content control system and transmitting an alert message when said content control system fails to attain one or more performance parameters.

31. The method of claim 27, wherein said distributing the new entertainment content comprises distributing the new entertainment content to each of the passenger entertainment systems such that the passenger entertainment systems uniformly receive the same entertainment content.

32. The method of claim 31, wherein said receiving system status data comprises receiving system status data from each of the passenger entertainment systems.

33. A terrestrial content control system for provisioning content among a plurality of passenger entertainment systems installed aboard passenger vehicles, each of the passenger entertainment systems having a plurality of passenger interface systems, comprising:

an application server system for receiving a content load identifying preselected entertainment content for distribution among the passenger entertainment systems, automatically recognizing new entertainment content identified by the content load for a selected passenger entertainment system installed aboard an associated passenger vehicle, pushing the new entertainment content to the selected passenger entertainment system, and dynamically reconfiguring the passenger interface systems aboard the associated passenger vehicle to present the new entertainment content during subsequent travel;

a content source system for providing entertainment content including the new entertainment content, said content source system having a mass storage system and a selected system resource each for providing at least a portion of the new entertainment content identified by the content load;

a central switching system for routing the new entertainment content from the mass storage system and the selected system resource to the selected passenger entertainment system, said central switching system receiving system status data from the selected passenger entertainment system and pushing the system status data to the mass storage system for storage, the system status data being compiled by the selected passenger entertainment system during previous travel;

a conversion system disposed between the central switching system and the selected system resource, said conversion system for converting signals in a first communication protocol from the selected system resource to a second communication protocol suitable for distribution to the selected passenger entertainment system via the central switching system; and said application server system for initiating a communication connection between said central switching system and the selected passenger entertainment system after the associated passenger vehicle arrives at the travel destination, said application server system controlling the pushing of the new entertainment content in the second communication protocol from said content source system to the selected passenger entertainment system and the providing of the system status data from the selected passenger entertainment system to said content source system such that the new entertainment content and the system status data are exchanged between said content source system to the selected passenger entertainment system during a single data exchange session while the associated passenger vehicle is at the travel destination, wherein said content control system forms a private network for providing comprehensive content management for the entertainment content routed to, and the system status data received from, the passenger entertainment systems.

34. The system of claim 33, wherein the selected system resource comprises a tape drive system.

35. The system of claim 33, wherein said content source system includes a plurality of selected system resources for providing respective portions of the new entertainment content identified by the content load via signals having diverse communication protocols; and wherein said conversion system converts the signals from the selected system resources into the second communication protocol suitable for distribution to the selected passenger entertainment system via the central switching system.

* * * * *